US011784975B1

(12) United States Patent
Raman

(10) Patent No.: US 11,784,975 B1
(45) Date of Patent: Oct. 10, 2023

(54) IMAGE-BASED FIREWALL SYSTEM

(71) Applicant: Bank of America Corporation, Charlotte, NC (US)

(72) Inventor: Sundarrajan Raman, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 206 days.

(21) Appl. No.: 17/368,684

(22) Filed: Jul. 6, 2021

(51) Int. Cl.
*H04L 9/40* (2022.01)
*G06F 21/62* (2013.01)
*G06F 21/12* (2013.01)
*G06F 21/32* (2013.01)
*G06V 40/16* (2022.01)

(52) U.S. Cl.
CPC ........ *H04L 63/0263* (2013.01); *G06F 21/125* (2013.01); *G06F 21/32* (2013.01); *G06F 21/6245* (2013.01); *G06V 40/172* (2022.01); *H04L 63/0209* (2013.01)

(58) Field of Classification Search
CPC ............. H04L 63/0263; H04L 63/0209; G06F 21/6245; G06F 21/125; G06F 21/32; G06V 40/172
USPC .......................................................... 726/11
See application file for complete search history.

(56) References Cited

U.S. PATENT DOCUMENTS

| | | | |
|---|---|---|---|
| 5,842,191 A | 11/1998 | Stearns | |
| 9,298,741 B1* | 3/2016 | Strand | H04N 21/4627 |
| 9,659,185 B2 | 5/2017 | Elovici et al. | |
| 10,262,236 B2 | 4/2019 | Lim et al. | |
| 2004/0131254 A1* | 7/2004 | Liang | A61B 5/1113 382/181 |
| 2007/0011711 A1 | 1/2007 | Wolf et al. | |
| 2011/0209194 A1* | 8/2011 | Kennedy | H04L 63/101 726/1 |
| 2011/0317009 A1 | 12/2011 | Kumaraswamy et al. | |
| 2013/0148898 A1* | 6/2013 | Mitura | G06V 10/764 382/195 |
| 2014/0250457 A1 | 9/2014 | Ramaswamy | |
| 2014/0259166 A1* | 9/2014 | Ghaskadvi | G06Q 30/0273 726/23 |

(Continued)

OTHER PUBLICATIONS

Raman, S., "Image-Based Query Language System for Performing Database Operations on Images and Videos," U.S. Appl. No. 17/357,641, filed Jun. 24, 2021, 44 pages.

(Continued)

*Primary Examiner* — Samson B Lemma

(57) ABSTRACT

A system includes a media source and a firewall system. The media source stores media content that includes one or both of an image or a video. The firewall system stores filtering criteria that include rules for blocking communication of all or a portion of the media content based at least in part on an identity of an individual appearing in the media content. The firewall system receives a request for the media content. The firewall system determines characteristics of a user that provided the request for the media content. The firewall system determines the identity of the individual appearing in the media content. Based at least in part on the characteristics of the user that provided the request for the media content, the identity of the individual appearing in the media content, and the filtering criteria, the firewall system determines an action for securing the media content.

17 Claims, 4 Drawing Sheets

(56) References Cited

U.S. PATENT DOCUMENTS

| | | | |
|---|---|---|---|
| 2015/0039607 A1* | 2/2015 | Lothian | G06F 16/24578 707/723 |
| 2015/0070516 A1* | 3/2015 | Shoemake | H04N 21/4542 348/207.11 |
| 2015/0256835 A1 | 9/2015 | Sakai | |
| 2016/0004914 A1 | 1/2016 | Park | |
| 2016/0019426 A1 | 1/2016 | Tusch et al. | |
| 2016/0379330 A1* | 12/2016 | Powers | G06F 21/00 382/100 |
| 2017/0185829 A1 | 6/2017 | Walsh et al. | |
| 2017/0223310 A1 | 8/2017 | Farrell et al. | |
| 2017/0311863 A1 | 11/2017 | Matsunaga | |
| 2017/0359622 A1* | 12/2017 | Gopalan | H04N 21/44008 |
| 2018/0114017 A1 | 4/2018 | Leitner et al. | |
| 2018/0225518 A1 | 8/2018 | Gu et al. | |
| 2018/0227482 A1* | 8/2018 | Holzer | G06V 20/10 |
| 2018/0268222 A1 | 9/2018 | Sohn et al. | |
| 2018/0316890 A1* | 11/2018 | Farrell | A63F 13/216 |
| 2018/0341878 A1 | 11/2018 | Azout et al. | |
| 2019/0019012 A1* | 1/2019 | Huang | G06V 40/161 |
| 2019/0029528 A1 | 1/2019 | Tzvieli et al. | |
| 2019/0046044 A1 | 2/2019 | Tzvieli et al. | |
| 2019/0052839 A1 | 2/2019 | Farrell et al. | |
| 2019/0073523 A1 | 3/2019 | Lee et al. | |
| 2019/0080392 A1* | 3/2019 | Youb | G06F 21/64 |
| 2019/0122072 A1 | 4/2019 | Cricrì et al. | |
| 2019/0147333 A1 | 5/2019 | Kallur Palli Kumar et al. | |
| 2019/0164173 A1* | 5/2019 | Liu | G06Q 30/0185 |
| 2019/0179861 A1 | 6/2019 | Goldenstein et al. | |
| 2019/0213720 A1 | 7/2019 | Urashita | |
| 2019/0213721 A1 | 7/2019 | Urashita | |
| 2019/0236614 A1 | 8/2019 | Burgin et al. | |
| 2019/0258870 A1 | 8/2019 | Kundu et al. | |
| 2019/0278378 A1 | 9/2019 | Yan et al. | |
| 2019/0290127 A1 | 9/2019 | Hanina et al. | |
| 2019/0290129 A1 | 9/2019 | Hanina et al. | |
| 2019/0303655 A1 | 10/2019 | Werner et al. | |
| 2019/0313915 A1 | 10/2019 | Tzvieli et al. | |
| 2019/0349613 A1* | 11/2019 | Pikes | H04N 21/26603 |
| 2019/0355128 A1 | 11/2019 | Grauman et al. | |
| 2020/0074183 A1 | 3/2020 | Altuev | |
| 2020/0092301 A1 | 3/2020 | Coffing | |
| 2020/0364460 A1* | 11/2020 | Kondabathini | G06V 40/168 |
| 2022/0319127 A1* | 10/2022 | Tkachenko | G06V 10/82 |

OTHER PUBLICATIONS

Raman, S., "System for Performing Programmatic Operations Using an Image-Based Query Language," U.S. Appl. No. 17/357,698, filed Jun. 24, 2021, 45 pages.

Raman, S., "Image-Based Firewall for Synthetic Media Prevention," U.S. Appl. No. 17/368,658, filed Jul. 6, 2021, 48 pages.

Raman, S., "Automated Video Verification," U.S. Appl. No. 17/177,659, filed Feb. 17, 2021, 38 page.

Raman, S., "Media Player and Video Verification System," U.S. Appl. No. 17/177,451, filed Feb. 17, 2021, 38 page.

Kvochko, E. et al., "Media Verification System," U.S. Appl. No. 16/847,962, filed Apr. 14, 2020, 37 page.

Raman, S., "Media Hosting System Employing a Secured Video Stream," U.S. Appl. No. 17/177,736, filed Feb. 17, 2021, 39 page.

Raman, S., "Video Player for Secured Video Stream," U.S. Appl. No. 17/177,880, filed Feb. 17, 2021, 36 page.

* cited by examiner

IMAGE-BASED FIREWALL SYSTEM

TECHNICAL FIELD

The present disclosure relates generally to media storage and management. More particularly, the present disclosure is related to an image-based firewall system.

BACKGROUND

Synthetic media, such as so called "deepfake" videos, can be generated to mislead media consumers. For instance, a video of an individual speaking can be edited or generated to make it appear as though a person has spoken words that the person did not actually speak and/or performed actions that the person he/she did not actually perform.

SUMMARY

Synthetic media is becoming increasingly realistic and difficult to recognize. People are generally unable to reliably identify images and videos that contain synthetic media. This disclosure recognizes shortcomings of previous technology for protecting against the consumption (e.g., viewing, listening to, etc.) and dissemination of media that could be used as a starting point for creating synthetic media. For instance, previous technology fails to provide tools for reliably detecting and blocking communication or presentation of media that contains actions (e.g., people speaking, making facial expressions, etc.) that could be used to create synthetic media. At best, previous technology may block all content from certain media providers (e.g., preventing access to media from certain URLs) without considering the content of the media itself. This can result in media being unnecessarily blocked in some cases and inappropriately accessed in other cases. Using previous technology, it is also impossible to identify and block portions of media that may be particularly useful for creating synthetic media.

Certain embodiments of this disclosure provide unique solutions to technical problems of previous technology, including those described above, by providing an image-based firewall system capable of efficiently and reliably blocking media content to prevent or reduce the creation of synthetic media. For example, the disclosed system provides several technical advantages which may include 1) the ability to rapidly and reliably determine whether given media content (e.g., image(s) and/or video(s)) should be allowed to be streamed or uploaded based on identified features of the media and the consumer/provider of the media; 2) the ability to block consumption and/or dissemination of portions of media (e.g., block particular faces or the like in video or image media to prevent its use for the creation of synthetic media); and 3) the ability to allow access to media from anonymous sources, which may otherwise have been blocked by previous technology, as long as established filtering criteria are satisfied (e.g., if facial expressions are not presented that can be used to create synthetic media). As such, this disclosure may improve the function of computer systems used to manage the storage, management, and communication of media content, such as videos, images, and the like. For example, the system described in this disclosure may facilitate the automatic determination of whether media content should be allowed for viewing/sending or blocked from viewing/sending. In some cases, the system may determine that the media content should be secured in some way (e.g., by blocking a portion, but not all, of the media). This was not possible using previous technology. The system described in this disclosure may also or alternatively decrease processing resources expended to perform these tasks, for example, by integrating with an appropriately structured media database and/or by caching previous actions for more rapid and computationally efficient decision making in the future.

In some embodiments, the systems, methods, and devices described in this disclosure may particularly be integrated into a practical application of an image-based firewall system that secures the communication of media content to reduce or eliminate the usage of the media content to create synthetic media. The image-based firewall system detects faces and/or face features in media content requested to be downloaded or viewed. The detected face(s) are compared to those in an established database. An action (allowing, blocking all, or blocking a portion of the media) is determined for securing the media content based at least in part on the detected face(s), the properties of the party requesting the media, and/or a downstream purpose of the media. This action is then automatically taken to ensure the media is secured (e.g., to prevent a user from accessing media that could be improperly used to create synthetic media). This improved media content security was not possible using previous technology.

In some embodiments, the systems, methods, and devices described in this disclosure may particularly be integrated into a practical application of an image-based firewall system that secures media content that is being received for presentation (e.g., content from some external sources). The image-based firewall system detects faces and/or face features in media content that is received externally (e.g., that is uploaded for viewing, that is part of an image-based authentication process, etc.). The detected face(s) are compared to those in an established database, and an action (allowing, blocking all, or blocking a portion of the media) is determined for securing the media content based at least in part on the detected face(s), the properties of the user sending the media, and/or a downstream purpose of the media (e.g., whether it is meant for entertainment, as part of an image-based authentication process, as part of a training data set for synthetic media detection, etc.). This action is then automatically taken to ensure the media is secured (e.g., to prevent exposure to others of media content that could be used to create synthetic media, to prevent compromise of image-based authentication processes, to prevent compromise of information used to train synthetic media detection tools, etc.).

Certain embodiments of this disclosure may include some, all, or none of these advantages. These advantages and other features will be more clearly understood from the following detailed description taken in conjunction with the accompanying drawings and claims.

In an embodiment, a system stores filtering criteria which include rules for blocking presentation of all or a portion of media content (e.g., an image and/or a video) based at least in part on an identity of an individual appearing in the media content. The firewall system receives the media content. The firewall system determines the identity of the individual appearing in the media content. Based at least in part on the identity of the individual appearing in the media content and the filtering criteria, the firewall system determines an action for securing the media content. The action may be allowing presentation of the media content, blocking presentation of the media content, or blocking presentation of a portion of the media content. The determined action is automatically implemented.

In another embodiment, a system includes a media source and a firewall system. The media source stores media content that includes one or both of an image or a video. The firewall system stores filtering criteria that include rules for blocking communication of all or a portion of the media content based at least in part on an identity of an individual appearing in the media content. The firewall system receives a request for the media content. The firewall system determines characteristics of a user that provided the request for the media content. The firewall system determines the identity of the individual appearing in the media content. Based at least in part on the characteristics of the user that provided the request for the media content, the identity of the individual appearing in the media content, and the filtering criteria, the firewall system determines an action for securing the media content. The action may be allowing communication of the media content, blocking communication of the media content, or blocking communication of a portion of the media content. The firewall system automatically implements the determined action.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, prior to this disclosure, there was a lack of tools for reliably detecting and preventing communication and/or presentation of media that could potentially be used as a starting point for creating synthetic media. This can result in media being unnecessarily blocked in some cases and inappropriately accessed in other cases. Using previous technology, it is also impossible to identify and block portions of media that may be particularly useful for creating synthetic media. The system described in this disclosure solves the technical problems of previous technology by determining a secured portion of a video or image that can be presented and/or communicated in order to reduce or eliminate the ability of bad actors to use media content to create synthetic media.

As used in this disclosure, media generally refers to video, images, and/or audio content. However, media encompasses any other appropriate media which may be shared and/or distributed in a digital format. An example of media for a subject is a video of the subject speaking. As used in this disclosure, "real media" refers to media that depicts (e.g., is a recording or other representation of) the subject without any adulteration to the information provided in the media. For example, a "real" video of a subject may be an audio-visual recording of the subject speaking. As used in this disclosure, "synthetic media" refers to media which has been edited to attribute actions and/or words to a subject that were not performed/spoken by the subject. For example, a "synthetic" video may include an edited version of a "real" video of the subject speaking which has been created or edited to show the subject speaking words that were not actually spoken by the subject in the real video.

Firewall System

Figure 1:
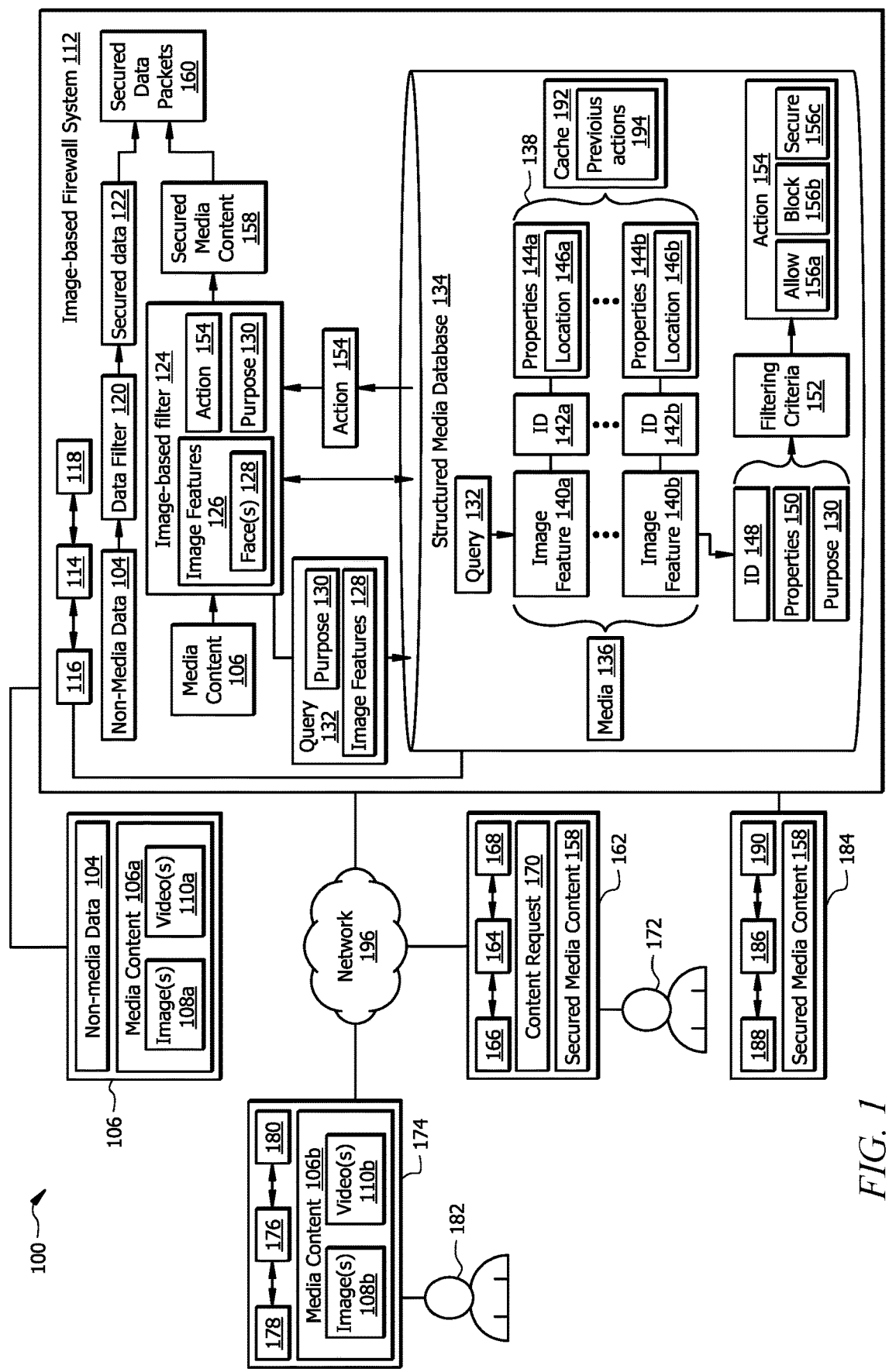
FIG. 1 is a schematic diagram of an example system configured for securing media content for presentation and/or communication.

FIG. 1 is a schematic diagram of an example system 100 for managing the presentation and/or communication of media content 106a,b, such as image(s) 108a,b and/or video(s) 110a,b. The system 100 improves the security of media content 106a,b by preventing the presentation and/or communication of media content 106a,b in a form that exposes the media content 106a,b to potentially being used for the creation of synthetic media. For example, as described further below, the image-based firewall system 112 may determine for given media content 106a,b corresponding secured media content 158 in which at least a portion of the media content 106a,b is blocked (e.g., removed, obscured, or the like) from being presented for viewing and/or communicated to another device 162, 174, 184 and/or user 172, 182. The system 100 includes an image-based firewall system 112, media-requesting device 162, external media source 174, media presentation device 184, and a network 196.

Image-Based Firewall System

The image-based firewall system 112 may include or be in communication with one or more internal media sources 102. The internal media source 102 generally includes any trusted source(s) of media content 106a, such as a server, data store, or database that is generally operated by the same administrators of the image-based firewall system 112. The media source(s) 102 store media content 106a and may optionally store related non-media content 104. The media content 106a may include images 108a (e.g., photographs), videos 110a (e.g., audio-visual recordings), and/or any other type of audio and/or visual data. The non-media data 104 includes any other information that may be provided along with the media content 106a such as text descriptions of the media content 106a and the like. The media source(s) 102 may provide the media content 106a and/or the non-media data 104 as a data stream for viewing by other devices, such as devices 162, 174, and/or 184.

The image-based firewall system 112 may secure media content 106a from the internal media source 102, such that an external user 172 cannot use the media content 106a to create synthetic media. The image-based firewall system 112 may also or alternatively help to ensure that before media content 106b from an external media source 174 (described below) is allowed to be presented (e.g., by a media presentation device 184), the media content 106b is secured to prevent the creation of synthetic media of any individuals or people appearing in the media content 106b. For example, the image-based firewall system 112 may determine corresponding secured media content 158 for media content 106a,b in which at least the portion of the media content 106a,b that could be used to create synthetic media of the individuals appearing in an image 108a,b and/or video 110,B is removed (e.g., by removing or obscuring faces, expressions, voices, or the like—see examples of FIGS. 2B and 2C).

The image-based firewall system 112 includes a processor 114, memory 116, and network interface 118. The processor 114 of the image-based firewall system 112 includes one or more processors. The processor 114 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 114 may be a programmable logic device, a microcontroller, a microprocessor, or any suitable combination of the preceding. The processor 114 is communicatively coupled to and in signal communication with the memory 116 and network interface 118. The one or more processors are configured to process data and may be implemented in hardware and/or software. For example, the processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory 116 and executes them by directing the coordinated operations of the ALU, registers and other components.

The memory 116 of the image-based firewall system 112 is operable to store information and data from the media source 102, a structured media database 134, filtering criteria 152, and any data, instructions, logic, rules, or code operable to execute the functions of the image-based firewall system 112. The memory 116 includes one or more disks, tape drives, or solid-state drives, and may be used as an over-flow data storage device, to store programs when such programs are selected for execution, and to store instructions and data that are read during program execution. The memory 116 may be volatile or non-volatile and may include read-only memory (ROM), random-access memory (RAM), ternary content-addressable memory (TCAM), dynamic random-access memory (DRAM), and static random-access memory (SRAM).

The network interface 118 of the image-based firewall system 112 is configured to enable wired and/or wireless communications. The network interface 118 is configured to communicate data between the image-based firewall system 112 and other network devices, systems, or domain(s), such as devices 162, 174, 184. The network interface 118 is an electronic circuit that is configured to enable communications between devices. For example, the network interface 118 may include one or more serial ports (e.g., USB ports or the like) and/or parallel ports (e.g., any type of multi-pin port) for facilitating this communication. As a further example, the network interface 118 may include a WIFI interface, a local area network (LAN) interface, a wide area network (WAN) interface, a modem, a switch, or a router. The processor 114 is configured to send and receive data using the network interface 118. The network interface 118 may be configured to use any suitable type of communication protocol as would be appreciated by one of ordinary skill in the art. The network interface 118 communicates media content 106a,b and/or secured media content 158 (e.g., as part of secured data packets 160, described further with respect to the example of FIG. 1 below).

The image-based firewall system 112 may be configured to secure media content 106b from an external media source 174 before it is allowed to be presented at a media presentation device 184 and/or to secure media content 106a that is communicated or streamed to an external user (e.g., to media-requesting device 162 of user 172). Operations of the image-based firewall system 112 to secure media content 106a being communicated to a media-requesting device 162 from an internal media source 102 are described in greater detail with respect to FIG. 3 below, while operations of the image-based firewall system 112 for securing received media content 106b from an external media source 174 before it is presented are described in greater detail with respect to FIG. 4 below. However, example operations for determining secured media content 158 for media content 106a,b are described briefly with respect to the example of FIG. 1 in the following.

The image-based firewall system 112 generally reviews at least the media content 106a,b that is to be secured and determines corresponding secured media content 158. The image-based firewall system 112 may include a data filter 120 that may review non-media content 104 (if present) and generate corresponding secured non-media data 122. For example, the data filter 120 may remove secure information, personal information, and the like from the non-media data 104. The image-based firewall system 112 includes an image-based filter 124 that determines image features 126 in the media content 106a,b and communicates with a structured media database 134 to determine an appropriate action 154 for generating secured media content 158, as described further below and with respect to the examples of FIGS. 3 and 4. In some cases, the secured media content 158 is combined with any secured non-media data 122, and this information is provided as secured data packets 160 to one or more of the devices 162 and/or 184 for presentation of the secured media content 158. For example, secured media content 158 generated for internally stored media content 106a may be communicated to an external user 172 (see also FIG. 3), while secured media content 158 generated for externally provided media content 106b may be presented on a media presentation device 184 associated with the image-based firewall system 112.

The image-based filter 124 determines image features 126 in the media content 106a,b. For instance, one or more faces 128 may be detected in image(s) 108a,b and/or video(s) 110a,b included in the media content 106a,b. The image features 126 may also include information about the types of facial features, expressions, and the like that are displayed in the media content 106a,b, the amount of time face(s) 128 (or facial, features, expressions, etc.) appear in video(s) 110a,b, and the like. For example, the image-based filter 124 may determine image features 126 corresponding to types of facial features and expressions presented in the media content 106a,b. As described below the image-based firewall system 112 may determine secured media content 158 in which types of facial features and/or expressions that may be used to create synthetic media of people presented in the media content 106a,b are blocked (See FIGS. 2B-2D).

In some cases, the image-based filter 124 may also determine an intended purpose 130 of the media content 106a,b. For example, the intended purpose 130 may indicate whether the media content 106a,b will be viewed privately and/or publicly. As such, the intended purpose 130 may include an intended audience of the presentation of the media content 106a,b (e.g., who will be allowed to view the media content 106a,b). In some cases, the intended purpose 130 may be to use the media content 106a,b as part of an image or video-based authentication process. For example, media content 106a may be provided to device 162 to be used to authenticate access to services provide by the device 162. In some cases, the image-based firewall system 112 may use the intended purpose 130 in part to determine the appropriate action 154 for generating secure media content 158.

In the example of FIG. 1, the image-based filter 124 provides a query 132 to a structured media database 134. The query 132 includes the image features 126 and/or intended purpose 130 determined by the image-based filter 124. The structured media database 134 is stored in memory 116 of the image-based firewall system 112 and includes media 136 (e.g., images, videos, and the like) of known people. The media 136 generally includes images and videos of people or individuals for whom the image-based firewall system 112 will help secure against the creation of synthetic media.

The structured media database 134 may also store (e.g., in memory 116 of the image-based firewall system 112) predetermined data 138 that describes the stored media 136. For example, the data 138 may include image features 140a,b for different people appearing in the stored media 136. For example, image features 140a,b corresponding to identifiable properties of people corresponding to identifiers 142a,b may be predetermined and stored as part of data 138. The data 138 may include other properties 144a,b of the known individuals corresponding to identifiers 142a,b. For example, the other properties 144a,b may indicate a risk level of the individuals (e.g., an extent to which bad actors are likely to try to create synthetic media of the individuals and/or an extent to which such synthetic media could be problematic). The other properties 144a,b may also or alternatively include a location 146a,b of the individuals corresponding to identifiers 142a,b. For example, the locations 146a,b may be used to secure media content 106a,b for individuals in certain locations 146a,b.

The data 138 (e.g., the image features 140a,b, identifiers 142a,b, and/or other properties 144a,b) may be used, at least in part, to identify individuals appearing in the media content 106a,b. For example, the image-based firewall system 112 may determine one or more identifiers 148 corresponding to an identity of an individual appearing in the media content 106a,b. The identifiers 148 may be determined, for example, by comparing image features 126 determined by the image-based filter 124 to the predetermined image features 140a,b of known individuals corresponding to identifiers 142a,b. If the image features 126 are within a threshold range of image features 140a,b for a known individual, the media content 106a,b may be determined to include an individual with the corresponding identifier 142a,b. For example, detected faces 128 in the media content 106a,b (e.g., the properties of these faces 128) may be compared to the predefined image features 140a,b of faces for known individuals corresponding to identifiers 142a,b to identity individuals in the media content 106a,b.

Figure 2A:
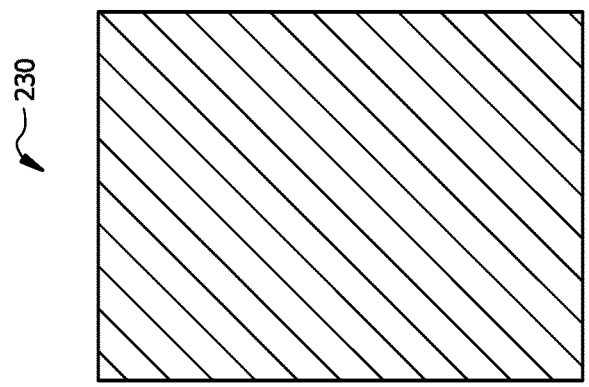
FIGS. 2A, 2B, 2C, and 2D are diagrams illustrating examples of secured media content.

In some embodiments, the image-based firewall system 112 uses the determined identity/identifier 148 and filtering criteria 152 to determine an appropriate action 154 for securing the media content 106a,b. The action 154 is automatically implemented such that secured media content 158 can be presented and/or communicated with little or no delay in an appropriately secured form, as secured media content 158. The action 154 may be to allow 156a, block 156b, or secure 156c the media content 106a,b. The allow 156a action corresponds to allowing the media content 106a,b to be presented and/or communicated in its entirety. For example, if the identifier 148 corresponds to a low priority individual for securing against synthetic media, then the allow 156a action may be determined. For the allow 156a action, the secured media content 158 may be the same as the original media content 106a,b. FIG. 2A shows an image frame 200 of example secured media 158 for an allow 156a in which the entire image frame 200 is presented and/or communicated, including the entire person 202 and person 204 appearing in the image frame 200.

Figure 2B:
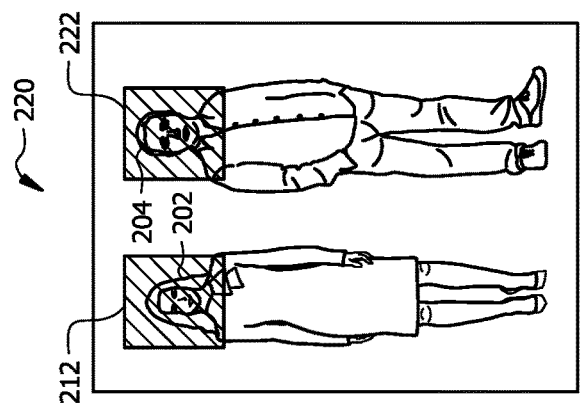
Figure 2C:
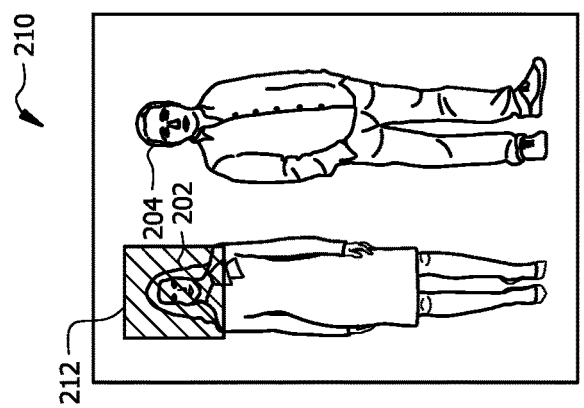
Figure 2D:
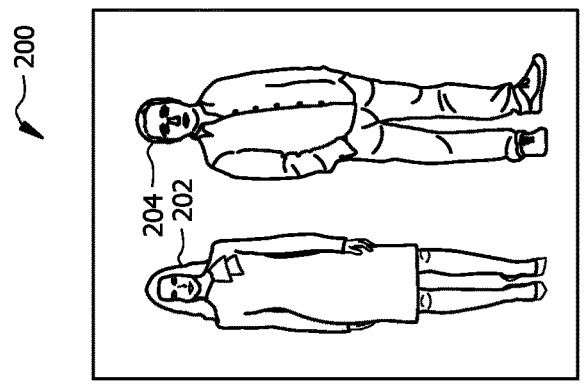

The block 156b action corresponds to fully blocking the media content 106a,b, such that content 106a,b cannot be presented or communicated. An example image frame 230 of secured media content 158 for a block 156b action is shown in FIG. 2D. In FIG. 2D, the entire image frame 230 cannot be viewed. In some cases, a message may be provided indicating the media content 106a,b was blocked from presentation or communication.

The secure 156c action corresponds to blocking a portion of the media content 106a,b from presentation and/or communication. The blocked portion of the media content 106a,b may be a portion that could be useful for creating synthetic media of higher priority individuals presented in the media content 106a,b. FIG. 2B illustrates an example image frame 210 of secured media content 158 determined for a secure 156c action. The example image frame 210 shows that the face region 212 of person 202 is blocked, while person 204 is visible. Such an image frame 210 may be determined, for example, if the first person 202 is at higher risk for having synthetic media created of them and/or is presenting features (e.g., speech, facial expressions, etc.) that can be used to effectively create synthetic media, while the second person 204 does not meet these filtering criteria 152. FIG. 2C illustrates another example image frame 220 of secured media content 158 determined for a secure 156c action. The example image frame 220 shows that both the face region 212 of person 202 and the face region 222 of person 204 are blocked. Such an image frame 220 may be determined, for example, if both the first person 202 and the second person 204 are at higher risk for having synthetic media created of them and/or are presenting features (e.g., speech, facial expressions, etc.) that can be used to effectively create synthetic media. In some cases, for video 110a,b media content 106a,b, an entire frame (e.g., as shown for image frame 230 of FIG. 2D), may be blocked, while other frames may be entirely visible (see, e.g., FIG. 2A) and/or partially visible (see, e.g., FIGS. 2B and 2C) for the secure 156c action.

In some embodiments, the image-based firewall system 112 determines characteristics/properties 150 of the media content 106a,b, and these properties 150 are used, in part, to determine the appropriate action 154 (e.g., allowing, blocking, or securing media content 106a,b). For instance, for media content 106a requested to be presented or received by a user 172, the image-based firewall system 112 may determine properties/characteristics 150 of the user 172 that provided a content request 170 for the media content 106a. The image-based firewall system 112 may determine, based at least in part on the properties/characteristics 150 of the user 172, the identifier 148 of the individual appearing in the media content 106a,b, and the filtering criteria 152, the action 154 for securing the media content 106a,b.

As another example, for securing media content 106b from an external media source 174, the properties 150 may be properties or characteristics of the external media source 102 (e.g., a geographic location of the external media source 174, an operator or user 182 of the external media source 174, an IP address of the external media source 174, etc.). The filtering criteria 152 may include rules for blocking presentation of all or a portion of the media content 106b based on whether a third party (e.g., user 182) associated with the media source 174 is trusted. The image-based firewall system 112 identifies the third party user 182 and uses the filtering criteria to determine if the third party user 182 is trusted. If the third party user 182 is not trusted, the image-based firewall system 112 determines the action 154 is to at least a secure 156c action to prevent presentation of at least a portion of the media content 106a,b.

As yet another example, the filtering criteria 152 may further include rules for blocking presentation of all or a portion of the media content 106a,b based on properties 150 corresponding to types of facial features and expressions presented in the media content 106*a,b*. Properties 150 that include facial features and expressions are determined. If, according to the filtering criteria 152, these properties 150 correspond to facial features and expressions that can be used to create synthetic media (e.g., that can be mimicked to create realistic synthetic media), all or a portion of the media content 106*a,b* may be blocked. However, if the properties 150 and filtering criteria 152 indicate that the facial features and expressions cannot be used to create synthetic media, then the media content 106*a,b* may be allowed to be presented and/or communicated. For instance, even if the user 172 requesting media content 106*a* or the third party user 182 providing media content 106*b* is not a trusted user, the image-based firewall system 112 may determine the action 154 is to allow 156*a* presentation and/or communication of all of the media content 106*a,b* as long as the properties 150 (e.g., facial features and/or expressions appearing in the media content 106*a,b*) indicate that synthetic media cannot be generated from the media content 106*a,b*. Further details and examples of the operation of the image-based firewall system 112 for securing media content 106*a,b* for presentation and/or communication are described with respect to the example operation scenarios of the system 100 below and with respect to the methods of FIGS. 3 and 4.

The image-based firewall system may include a cache 192 storing previous actions 194 performed by the image-based firewall system 112. As described further with respect to the various examples described below and the methods of FIGS. 3 and 4. The cache 192 may be used to identify appropriate an appropriate action 154 for securing media content 106*a,b* if the same or similar scenario for communicating and/or presenting the media content 106*a,b* has been encountered previously and recorded in the cache 192.

Media-Requesting Device

The media-requesting device 162 is generally a computing device, such as a computer, smartphone, tablet, or the like, that provides a content request 170 for media content 106*a* and receives corresponding secured media content 158 in response to the request 170. The content request 170 may be provided by a user 172 operating the device 162 via any appropriate input (e.g., selection from a menu, a text input, a speech input, etc.). The content request 170 may be associated with an image-based authentication process being performed at the media-requesting device 162. As described in this disclosure, the image-based firewall system 112 helps to ensure that any media content 106*a,b* is first secured, as secured media content 158, before it is provided the media-requesting device 162. This aids in preventing the user 172 from using the media content 106*a* to create synthetic media of individuals appearing in the media content 106*a*. As described elsewhere in this disclosure, the image-based firewall system 112 may secure the requested media content 106*a* based at least in part on characteristics/properties 150 of the user 172 that provided the content request 170. For example, the characteristics/properties 150 may be a geographical location of the user 172 and/or the device 162, an internet protocol (IP) address associated with the user 172 and/or the device 162, an identity of the user 172, or the like. In some cases, the firewall system 112 determines whether the user 172 is a trusted user. If the user 172 is not trusted, the action 154 to secure the media content 106*a* may be to block 156*b* the requested content entirely or secure 156*c* the content by blocking a portion of the requested content 106*a*. For example, the secured media content 158 may only have portions that could be used to create synthetic media blocked (e.g., faces of one or more individuals presented in the requested media content 106*a*, as illustrated in the examples of FIGS. 2B and 2C, described above).

The media-requesting device 162 includes a processor 164, memory 166, and network interface 168. The processor 164 of the media-requesting device 162 includes one or more processors. The processor 164 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 164 may be a programmable logic device, a microcontroller, a microprocessor, or any suitable combination of the preceding. The processor 164 is communicatively coupled to and in signal communication with the memory 166 and network interface 168. The one or more processors are configured to process data and may be implemented in hardware and/or software. For example, the processor 164 may be 8-bit, 16-bit, 32-bit, 64-bit or of any other suitable architecture. The processor 164 may include an arithmetic logic unit (ALU) for performing arithmetic and logic operations, processor registers that supply operands to the ALU and store the results of ALU operations, and a control unit that fetches instructions from memory 166 and executes them by directing the coordinated operations of the ALU, registers and other components.

The memory 166 of the media-requesting device 162 is operable to store content request 170, secured media content 158, and any data, instructions, logic, rules, or code operable to execute the functions of the media-requesting device 162 (e.g., for display of the secured media content 158). The memory 166 includes one or more disks, tape drives, or solid-state drives, and may be used as an over-flow data storage device, to store programs when such programs are selected for execution, and to store instructions and data that are read during program execution. The memory 166 may be volatile or non-volatile and may comprise read-only memory (ROM), random-access memory (RAM), ternary content-addressable memory (TCAM), dynamic random-access memory (DRAM), and static random-access memory (SRAM).

The network interface 168 of the media-requesting device 162 is configured to enable wired and/or wireless communications. The network interface 168 is configured to communicate data between the media-requesting device 162 and other network devices, systems, or domain(s), such as the image-based firewall system 112. The network interface 168 is an electronic circuit that is configured to enable communications between devices. For example, the network interface 118 may include one or more serial ports (e.g., USB ports or the like) and/or parallel ports (e.g., any type of multi-pin port) for facilitating this communication. As a further example, the network interface 168 may include a WIFI interface, a local area network (LAN) interface, a wide area network (WAN) interface, a modem, a switch, or a router. The processor 164 is configured to send and receive data using the network interface 168. The network interface 168 may be configured to use any suitable type of communication protocol as would be appreciated by one of ordinary skill in the art. The network interface 168 communicates content request 170 and secured media content 158 (e.g., as part of secured data packets 160, described above).

External Media Source

The external media source 174 is generally any device or collection of devices (e.g., implemented as a server, data store, or the like) that is operable to provide media content 106*b*. The media source 174 stores media content 106*b* and may optionally store related non-media content similar or the same to data 104, described above. The media content 106b may be the same as media content 106a, described above. For example, the media content 106b may include images 108b (e.g., photographs), videos 110b (e.g., audio-visual recordings), and/or any other type of audio and/or visual data. The external media source 174 may provide the media content 106b as a data stream for viewing by other devices, such as devices 162 and/or 184. The image-based firewall system 112 secures the potentially untrusted media content 106b before it is provided for presentation.

The external media source 174 may include a processor 176, memory 178, and network interface 180. The processor 176 of the external media source 174 includes one or more processors. The processor 176 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 176 may be a programmable logic device, a microcontroller, a microprocessor, or any suitable combination of the preceding. The processor 176 is communicatively coupled to and in signal communication with the memory 178 and network interface 180. The one or more processors are configured to process data and may be implemented in hardware and/or software. For example, the processor 176 may be 8-bit, 16-bit, 32-bit, 64-bit or of any other suitable architecture. The processor 176 may include an arithmetic logic unit (ALU) for performing arithmetic and logic operations, processor registers that supply operands to the ALU and store the results of ALU operations, and a control unit that fetches instructions from memory 178 and executes them by directing the coordinated operations of the ALU, registers and other components.

The memory 178 of the external media source 174 is operable to store at least media content 106b and any data, instructions, logic, rules, or code operable to execute the functions of the external media source 174 (e.g., to stream the media content 106b via network 196). The memory 178 includes one or more disks, tape drives, or solid-state drives, and may be used as an over-flow data storage device, to store programs when such programs are selected for execution, and to store instructions and data that are read during program execution. The memory 178 may be volatile or non-volatile and may comprise read-only memory (ROM), random-access memory (RAM), ternary content-addressable memory (TCAM), dynamic random-access memory (DRAM), and static random-access memory (SRAM).

The network interface 180 of the external media source 174 is configured to enable wired and/or wireless communications. The network interface 180 is configured to communicate data between the external media source 174 and other network devices, systems, or domain(s), such as the image-based firewall system 112. The network interface 180 is an electronic circuit that is configured to enable communications between devices. For example, the network interface 180 may include one or more serial ports (e.g., USB ports or the like) and/or parallel ports (e.g., any type of multi-pin port) for facilitating this communication. As a further example, the network interface 180 may include a WIFI interface, a local area network (LAN) interface, a wide area network (WAN) interface, a modem, a switch, or a router. The processor 176 is configured to send and receive data using the network interface 180. The network interface 180 may be configured to use any suitable type of communication protocol as would be appreciated by one of ordinary skill in the art. The network interface 180 communicates media content 106b.

Media Presentation Device

The media presentation device 184 is generally a device, such as a computer, smartphone, tablet, or the like, that is communicatively coupled to the image-based firewall system 112. The media presentation device 184 is configured to display secured media content 158 that is determined by the image-based firewall system 112. For example, the media presentation device 184 may display secured media 158 that is determined from internally available media content 106a and/or from media content 106b from an external media source 174. While shown as a separate device 184 in the example of FIG. 1, the media presentation device 184 may be integrated within the image-based firewall system 112, such that all or a portion of the functions of the media presentation device 184 are performed by the image-based firewall system 112. In other words, the image-based firewall system 112 can display secured media content 158 in some embodiments.

The media presentation device 184 includes a processor 186, memory 188, and network interface 190. The processor 186 of the media presentation device 184 includes one or more processors. The processor 186 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 186 may be a programmable logic device, a microcontroller, a microprocessor, or any suitable combination of the preceding. The processor 186 is communicatively coupled to and in signal communication with the memory 188 and network interface 190. The one or more processors are configured to process data and may be implemented in hardware and/or software. For example, the processor 186 may be 8-bit, 16-bit, 32-bit, 64-bit or of any other suitable architecture. The processor 186 may include an arithmetic logic unit (ALU) for performing arithmetic and logic operations, processor registers that supply operands to the ALU and store the results of ALU operations, and a control unit that fetches instructions from memory 188 and executes them by directing the coordinated operations of the ALU, registers and other components.

The memory 188 of the media presentation device 184 is operable to store secured media content 158 and any data, instructions, logic, rules, or code operable to execute the functions of the media presentation device 184 (e.g., to display the secured media content 158). The memory 188 includes one or more disks, tape drives, or solid-state drives, and may be used as an over-flow data storage device, to store programs when such programs are selected for execution, and to store instructions and data that are read during program execution. The memory 188 may be volatile or non-volatile and may comprise read-only memory (ROM), random-access memory (RAM), ternary content-addressable memory (TCAM), dynamic random-access memory (DRAM), and static random-access memory (SRAM).

The network interface 190 of the media presentation device 184 is configured to enable wired and/or wireless communications. The network interface 190 is configured to communicate data between the media presentation device 184 and other network devices, systems, or domain(s), such as the image-based firewall system 112. The network interface 190 is an electronic circuit that is configured to enable communications between devices. For example, the network interface 190 may include one or more serial ports (e.g., USB ports or the like) and/or parallel ports (e.g., any type of multi-pin port) for facilitating this communication. As a further example, the network interface 190 may include a WIFI interface, a local area network (LAN) interface, a wide area network (WAN) interface, a modem, a switch, or a router. The processor 186 is configured to send and receive data using the network interface 190. The network interface 190 may be configured to use any suitable type of communication protocol as would be appreciated by one of ordinary skill in the art. The network interface 190 receives secured media content 158 (e.g., as part of secured data packets 160, described above).

Network

Network 196 facilitates communication between and amongst the various components of the system 100. This disclosure contemplates network 196 being any suitable network operable to facilitate communication between the components of the system 100. Network 196 may include any interconnecting system capable of transmitting audio, video, signals, data, messages, or any combination of the preceding. Network 196 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In an example operation of the system 100 for securing media content 106a from an internal media source 102, a content request 170 for stored media content 106a is received by the image-based firewall system 112. The media content 106a may be a video 110a of an individual 202 (see FIG. 2A). The image-based firewall system 112 determines characteristics/properties 150 of the user 172 that provided the content request 170. For example, the characteristics/properties 150 of the user 172 may include one or more of a geographical location of the user 172 (or the user's device 162), an internet protocol (IP) address of the user's device 162, and an identity of the user 172. The characteristics/properties 150 of the user 172 are used to determine if the user 172 can generally be trusted to not use the video 110a to create synthetic media.

The image-based firewall system 112 also determines the identity of the individual 202 appearing in the media content 106a. For example, an identifier 148 of the individual 202 presented in the media content 106a may be determined by detecting image features 126, such as faces 128, in the video 110a and comparing the detected image features 126 to previously determined image features 140a,b for known individuals corresponding to identifiers 142a,b. The identity of the individual 202 appearing in the video 110a is generally used to determine whether there is a need to protect the individual 202 from the creation of synthetic media. For example, a high ranking member of an organization or another public figure may require greater protection against synthetic media creation than a general member of the public.

The image-based firewall system 112 then determines, based at least in part on the characteristics/properties 150 of the requesting user 172, the identity/identifier 148 of the individual 202 appearing in the video 110a, and filtering criteria 152, an action 154 for securing the video 110a. As described above, the action 154 may be to allow 156a communication of the video 110a (see FIG. 2A), block 156b communication of the video 110a (see FIG. 2D), or secure 156c the video 110a for communication (see FIGS. 2B and 2C). The image-based firewall system 112 automatically implements the determined action 154, such that the video 110a is rapidly communicated as secured media content 158 without causing a long wait time for an end user of the secured media content 158 (e.g., user 172 in this example operation).

In some embodiments, the image-based firewall system 112 checks in the cache 192 of previous actions 194 to determine if a previous action 194 has already been determined for the combination of video 110a, properties 150 of the requesting user 172, and identifier 148 of the individual 202 presented in the video 110a. If such a previous action 194 exits, it may be automatically implemented by the image-based firewall system 112 as the action 154.

In some embodiments, the filtering criteria 152 include rules for blocking communication of all or a portion of the media content 106a based on properties 150 of the media content 106a, such as facial features and expressions presented in the media content 106a. Certain facial features and expressions, such as those displayed during speech, may be particularly useful for creating realistic synthetic media, and the image-based firewall system 112 may be able to prevent the communication of such properties 150 to improve protection against the creation of synthetic media. In such embodiments, the image-based firewall system 112 may determine, for the individual 202 appearing in the video 110a, the types of facial features and expressions presented in the video 110a. The image-based firewall system 112 determines, using the filtering criteria 152, whether the determined types of facial features and expressions presented in the video 110a can be used to generate synthetic media of the individual 202 appearing in the video 110a (e.g., if predefined facial features and expressions are displayed in certain frames of the video 110a).

If the facial features and expressions cannot be used to create synthetic media of the individual 202, the image-based firewall system 112 may determine that the action 154 is to allow 156a communication of the video 110a. In such cases, communication of the video 110a may even be allowed to untrusted users 172, because the video 110a will not generally be useful for generating synthetic media even if this were the user's intent.

However, if the facial features and expressions can be used to generate synthetic media of the individual 202, the image-based firewall system 112 may determine that the action 154 is to block 156b or secure 156c the video 110a. For example, the image-based firewall system 112 may secure 156c the video 110a by blocking communication of the face 212 of the individual 202 at least when the types of facial features and expressions are visible in the video 110a. For example, at least frames of the video 110a that show certain facial features and expressions may be blocked, as illustrated in FIG. 2B. In some cases, frames of the video 110a showing facial features and expressions that can be used to generate synthetic media of the individual 202 are blocked from communication (see FIG. 2D).

In an example operation of the system 100 for securing the presentation of media content 106b obtained from an external media source 174, the image-based firewall system 112 receives a video 110b of an individual 202 (see FIG. 2A). The image-based firewall system 112 determines an identity/identifier 148 of the individual 202 appearing in the video 110b (e.g., as described for the example operation above). The image-based firewall system 112 then determines, based at least in part on the identity/identifier 148 of the individual 202 and the filtering criteria 152 (see description of FIG. 1 above and example of FIG. 4 below), an action 154 for securing the video 110b. For example, as described above, the action 154 may be to allow 156a presentation of the video 110b (see FIG. 2A), block 156b presentation of the video 110b (see FIG. 2D), or secure 156c the video 110b for presentation (see FIGS. 2B and 2C). The image-based firewall system 112 then automatically implements the determined action 154. In some cases, the action 154 may be an appropriate previous action 194 identified by the image-based firewall system 112.

In some embodiments, the image-based firewall system 112 determines an intended purpose 130 of the video 110. The intended purpose 130 may, for example, be an intended audience of the video 110b. In such embodiments, the filtering criteria 152 include rules for blocking presentation of all or a portion of the video 110b based on the intended purpose 130 of the video 110b. the image-based firewall system 112 then determines, using the filtering criteria 152, whether the intended purpose 130 is an allowed or trusted purpose. If the intended purpose is allowed or trusted, the video 110b may be allowed to be presented. Otherwise, presentation of the video 110b may be at least partially prevented (e.g., by blocking a portion of the video 110b, as in the examples of FIGS. 2B and 2C, or blocking all of the video 110b, as in the example of FIG. 2D).

Similarly to as described with respect to the example operation of system 100 above, in some embodiments, the image-based firewall system 112 uses properties 150, such as facial features and expressions presented by the individual 202, to determine the action 154 and/or identify specific portions of the video 110b (e.g., face region 212 of FIG. 2B, a subset of all the frames of the video 110b, etc.) to block from presentation.

Example Operation for Securing Communication of Media Content

Figure 3:
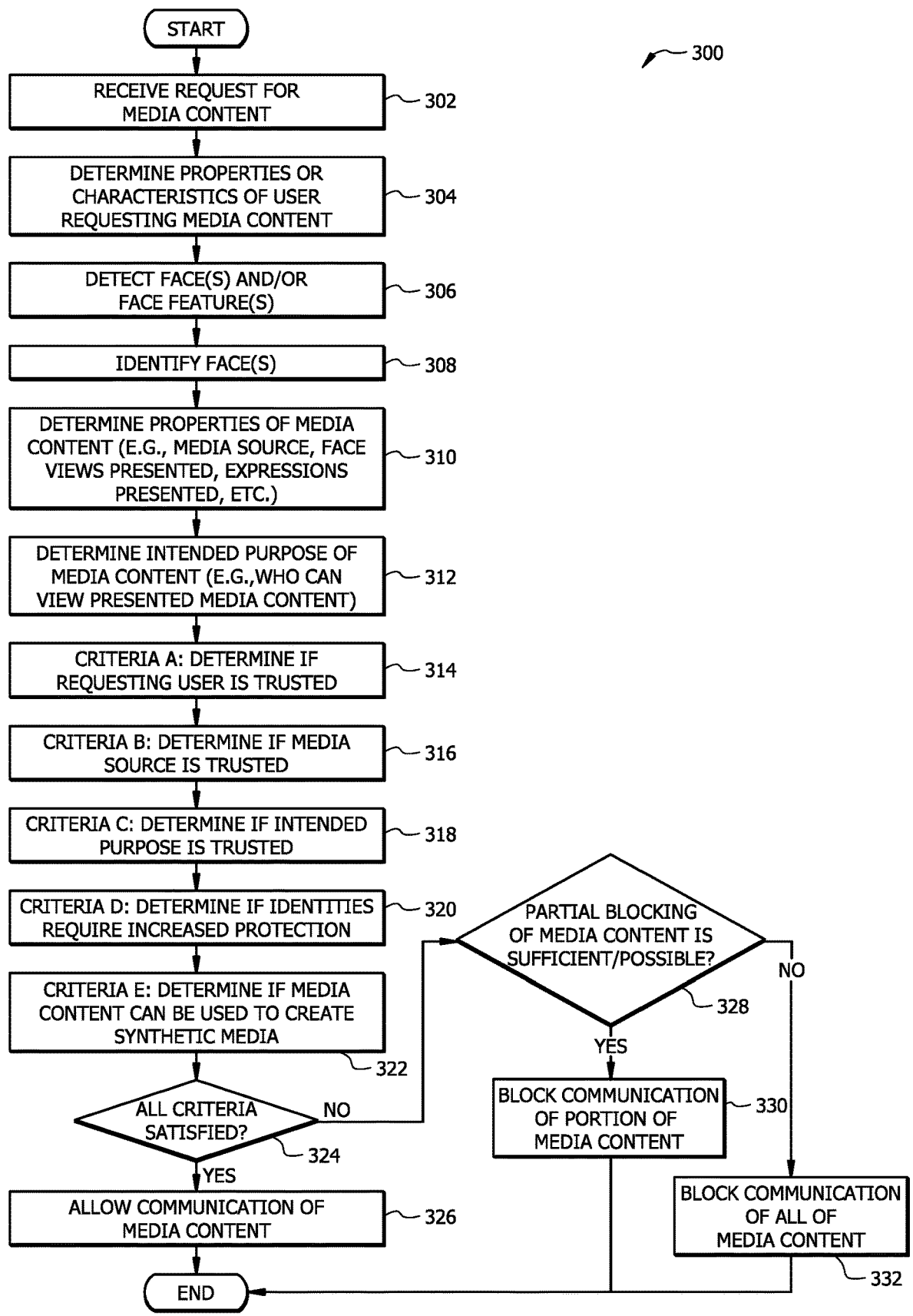
FIG. 3 is a flowchart illustrating an example method of securing media content for communication.

As described above, in some embodiments, the image-based firewall system 112 secures media content 106a that is to be communicated to media-requesting device 162. The image-based firewall system 112 may allow communication of media content 106a,b or determine secured media content 158 in which all or a portion of the media content 106a,b is blocked from communication. FIG. 3 is a flowchart of an example method 300 for operating the image-based firewall system 112 of FIG. 1 for securing media content 106a being communicated to the media-requesting device 162. The method 300 may begin at step 302 where a content request 170 is received. The content request 170 generally includes a request to the media content 106a and to present the media content 106a on a display of the device 162.

At step 304, the image-based firewall system 112 determines characteristics/properties 150 of the user 172. For example, the image-based firewall system 112 may determine characteristics/properties 150 that include one or more of an identity of the user 172, a geographic location of the user 172 (or the user's device 162), an IP address of the user's device 162, and the like.

At step 306, the image-based firewall system 112 determines image features 126, including detecting faces 128, in the media content 106a. The image-based firewall system 112 may employ any appropriate face detection algorithm to detect faces 128 in the image(s) 108a and/or video(s) 110a of the media content 106a. At step 308, the image-based firewall system 112 then determines identities, or identifiers 148, for the detected face(s) 128 from step 306. For example, as described with respect to FIG. 1 above, the image-based firewall system 112 may compare image features 126 for detected faces 128 to predefined image features 140a,b for known individuals corresponding to identifiers 142a,b. Face(s) 128 with image features 126 within a threshold range of established image features 140a,b are identified as the individuals with the corresponding identifiers 142a,b.

At step 310, properties 150 of the media content 106a may be determined. For example, the properties 150 may include types of facial features and expressions presented in the media content 106a (e.g., whether the media content 106a includes an individual that is smiling, laughing, talking, or generally presenting other facial features or expressions that may be used to create synthetic media of the individual). For instance, the image-based firewall system 112 may determine, for each of one or more individuals (e.g., people 202, 204 of FIG. 2A) appearing in the media content 106a, the types of facial features and expressions presented in the media content 106a. The image-based firewall system 112 uses these properties 150 (see step 322) to determine if types of facial features and expressions presented in the media content 106a can be used to generate synthetic media of the individual(s) and appropriately block communication of at least the portion of the media content 106a that can be used to create synthetic media (see steps 328-332).

At step 312, an intended purpose 130 of the media content 106a may be determined. For example, the indented purpose 130 may include an indication of a number of people who will view the media content 106a, whether the media content 106a will be available at device 162 to be viewed privately or publicly, and the like. As another example, the intended purpose 130 may indicate an intended audience of a presentation of the media content 106a. Depending on the intended audience, all or a portion of the media content 106a may be blocked (see, e.g., steps 318 and 328-332, described below).

At steps 314-322, the image-based firewall system 112 generally determines whether the determined identity, or identifier 148 (from step 308), the properties 150 (from step 310), and/or the intended purpose 130 satisfy various filtering criteria 152 (referred to as Criteria A-E in the example of FIG. 3). In some cases, a previous action 194 may already have been determined for the requested media content 106a. If the same user 172 is requesting the same media content 106a for which a previous action 194 was already determined, the previous action 194 may be used as action 154 to secure the media content 106a (see steps 326, 330, 332, described below). However, in other cases, the filtering criteria 152 are used to determine the action 154 for securing the media content 106a, as described with respect to steps 314-322 below.

At step 314, the image-based firewall system 112 determines if the requesting user 172 is a trusted user. For example, the image-based firewall system 112 may use the characteristics/properties 150 of the user 172 (see step 304) to determine if the user 172 is trusted. For example, the user 172 may be trusted or not trusted based on the location of the user 172, an IP address of the user's device 162, an identity of the user 172, or the like. The image-based firewall system 112 determines, based at least in part on the determined identity/identifier 148 of the user 172 (see step 308), whether the user 172 is trusted (e.g., if the identity/identifier 148 appears on a list of trusted users). As described further below (see step 320), if the user 172 is not trusted then the image-based firewall system 112 may determine to block at least a portion of the media content 106a (e.g., by performing a block 156b action or a secure 156c action). In some cases, even an untrusted user may be provided with all or a significant portion of the media content 106a as long as the media content 106a does not include characteristics/properties 150 that can be used to create synthetic media (e.g., facial features and expressions, —see steps 318 and 320).

At step 316, the image-based firewall system 112 may determine whether the original source of the media content 106a is trusted (e.g., whether the entity or user that recorded the media content 106a is amongst a list of trusted entities and/or users). At step 318, the image-based firewall system 112 determines if the intended purpose 130 of the media content 106a is a trusted or approved purpose. For example, the image-based firewall system 112 may use filtering criteria 152 that include rules for blocking communication of all or a portion of the media content 106a based on the intended purpose 130 determined at step 312 to determine if all or a portion of the media content 106a should be blocked from communication. For instance, if the intended purpose 130 matches a predefined purpose in the filtering criteria 152 that is not trusted, then all or a portion of the media content 106a may be blocked at steps 330 or 332.

At step 320, the image-based firewall system 112 determines if the identities or identifiers 148 of individuals appearing in the media content 106a correspond to individuals requiring increased protection against the creation of synthetic media. For example, a subset of all identifiers 142a,b in the structured media database 134 may correspond to individuals requiring increased protection against synthetic media. As mentioned briefly above, portions of the media content 106a that cannot be used to create synthetic media may be allowed to be communicated, while only portions that can be used to create synthetic media (e.g., because of the appearance of certain facial features and/or expressions) may be blocked (see FIGS. 2B and 2C for example). For instance, even after determining that the user 172 is not trusted all or a portion of the media content 106a may be communicated as long as properties 150 are not identified for facial features and expressions that can be used to generate synthetic media of an individual appearing in the media content 106a.

At step 322, the image-based firewall system 112 determines whether the media content 106a can be used to create synthetic media. For example, the image-based firewall system 112 may use filtering criteria 152 that include rules for blocking communication of all or a portion of the media content 106a based on properties 150, such as the types of facial features and expressions presented in the media content 106a (see step 310). The image-based firewall system 112 uses these filtering criteria 152 and the properties 150 to determine if types of facial features and expressions presented in the media content 106a can be used to generate synthetic media of individual(s). If such properties 150 are not present in the media content 106a, then communication of the media content 106a may be allowed at step 326. Otherwise, all or a portion of the media content 106a is blocked from communication at steps 330 or 332.

At step 324, the image-based firewall system 112 determines if all of the filtering criteria 152 from steps 314-322 are satisfied. If this is the case, the image-based firewall system 112 may determine that the action 154 for securing the media content 106a is to allow 156a the media content 106a. In this case, the image-based firewall system 112 proceeds to step 326 and allows communication of the requested media content 106a (e.g., such that the secured media content 158 is the same as the media content 106a without any portion of the media content 106a blocked).

However, if at step 324, all criteria 152 are not satisfied, the image-based firewall system 112 proceeds to step 328.

At step 328, the image-based firewall system 112 determines whether a partial blocking of the media content 106a is sufficient to secure the media content 106a. For example, the image-based firewall system 112 may determine if properties 150, such as facial features and/or expressions that can be used to create synthetic media appear in only a portion of the media content 106a. If this is the case, partial blocking of the media content 106a may be sufficient/possible. Portions of the media content 106a with these properties (e.g., the face regions 212 and 222 of FIGS. 2B and 2C) may be blocked from communication, while other portions are included in the secured media content 158.

If partial blocking of the media content 106a is sufficient/possible at step 328, the image-based firewall system 112 determines the action 154 is to secure 156c the media content 106a. The image-based firewall system 112 then proceeds to step 330 and blocks communication of a portion of the media content 106a in the secured media content 158 (see FIGS. 2B and 2C for illustrative examples of blocking a portion of media content 106a). However, if partial blocking of the media content 106a is not sufficient/possible at step 328, the image-based firewall system 112 determines the action 154 is to block 156b the media content 106a. The image-based firewall system 112 then proceeds to step 332 and blocks communication of the media content 106a in its entirety (see the example of FIG. 2D).

Example Operation for Securing Media Content for Presentation

Figure 4:
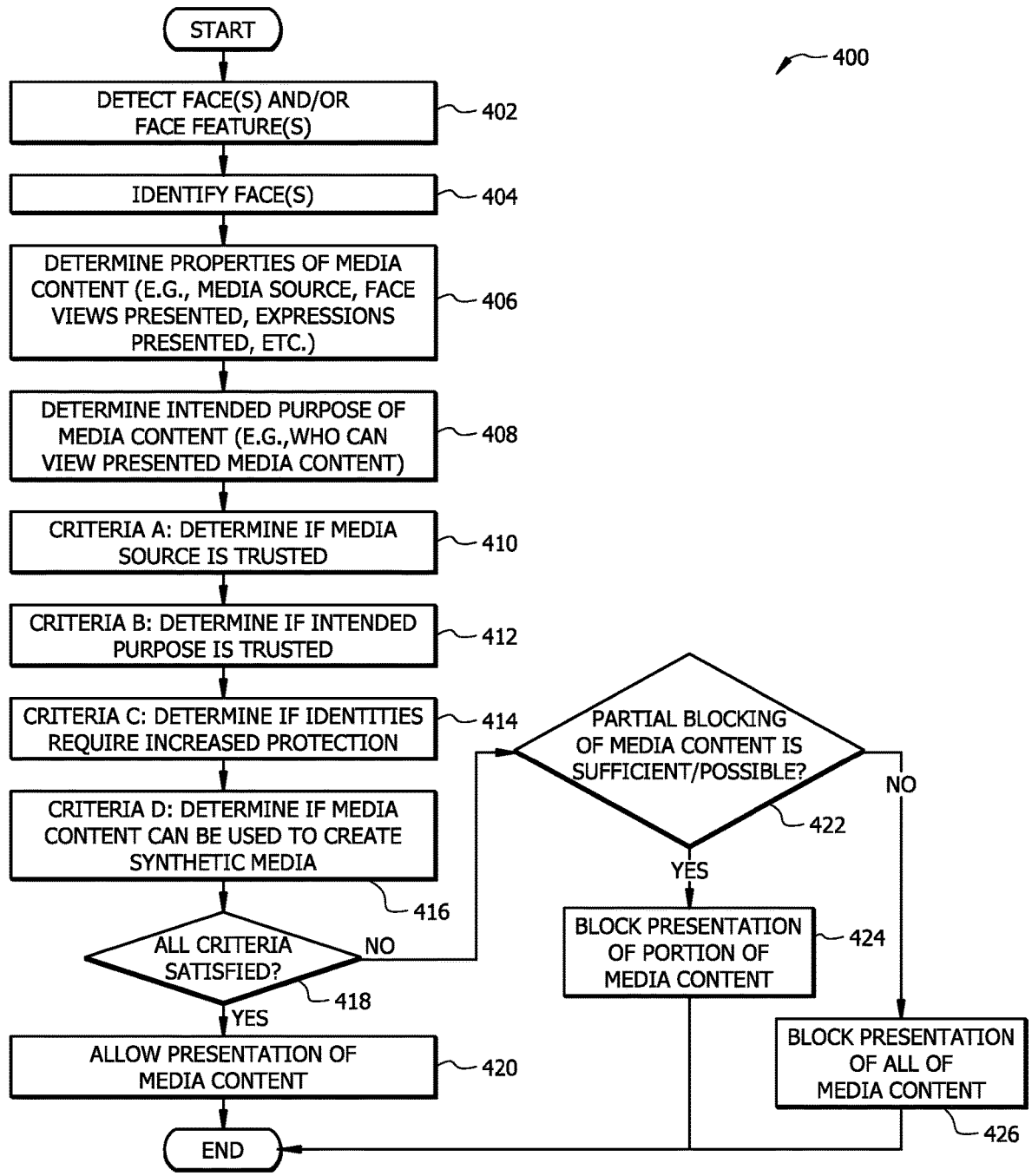
FIG. 4 is a flowchart illustrating an example method of securing media content for presentation.

As described above, in some embodiments, the image-based firewall system 112 secures media content 106b (e.g., from an external media source 174) prior to its presentation. The image-based firewall system 112 may allow presentation of media content 106b or determine secured media content 158 in which all or a portion of the media content 106b is blocked from presentation. FIG. 4 is a flowchart of an example method 400 for operating the image-based firewall system 112 of FIG. 1 for securing media content 106b being presented.

The method 400 may begin at step 402 where the image-based firewall system 112 determines image features 126, including detecting faces 128 in the media content 106b. The image-based firewall system 112 may employ any appropriate face detection algorithm to detect faces in the image(s) 108a and/or video(s) 110a of the media content 106b. At step 404, the image-based firewall system 112 then determines identities, or identifiers 148, for the detected face(s) 128 from step 402. For example, as described with respect to FIG. 1 above, the image-based firewall system 112 may compare image features 126 for detected faces 128 to predefined image features 140a,b for known individuals corresponding to identifiers 142a,b. Face(s) 128 with image features 126 within a threshold range of established image features 140a,b are identified as the individuals with the corresponding identifiers 142a,b.

At step 406, properties 150 of the media content 106b may be determined. For example, the properties 150 may include types of facial features and expressions presented in the media content 106b (e.g., whether the media content 106b includes an individual that is smiling, laughing, talking, or generally presenting other facial features or expressions that may be used to create synthetic media of individuals). For instance, the image-based firewall system 112 may determine, for each of one or more individuals (e.g., people 202, 204 of FIG. 2A) appearing in the media content 106b, the types of facial features and expressions presented in the media content 106b. The image-based firewall system 112 uses these properties 150 (see step 416) to determine if types of facial features and expressions presented in the media content 106b can be used to generate synthetic media of the individual(s) and appropriately block presentation of at least the portion of the media content 106b that can be used to create synthetic media (see steps 422-426).

At step 408, an intended purpose 130 of the media content 106b may be determined. For example, the indented purpose 130 may include an indication of a number of people who will view the media content 106b, whether the media content 106b will be available to be viewed privately or publicly, and the like. As another example, the intended purpose 130 may indicate an intended audience of a presentation of the media content 106b. Depending on the intended audience, all or a portion of the media content 106b may be blocked (see steps 412 and 422-426, described below).

At steps 410-416, the image-based firewall system 112 generally determines whether the determined identity, or identifier 148 (from step 404), the properties 150 (from step 406), and/or the intended purpose 130 (from step 408) satisfy various filtering criteria 152 (referred to as Criteria A-D in the example of FIG. 4). In some cases, a previous action 194 may already have been determined for the requested media content 106b. If the same media content 106b was previously presented for which a previous action 194 was already determined, the previous action 194 may be used to secure the media content 106b (see steps 420, 424, 426, described below). However, in other cases, the filtering criteria 152 are used to determine the action 154 for securing the media content 106b, as described with respect to steps 410-416 below.

At step 410, the image-based firewall system 112 may determine whether the media source 174 of the media content 106b is trusted. For example, the image-based firewall system 112 may determine whether the third party user 182 operating the media source 174 is a trusted user. For example, the image-based firewall system 112 may determine characteristics/properties 150 of the third party user 182 and use these properties/characteristics 150 to determine if the third party user 182 is trusted. For example, the user 182 may be trusted or not trusted based on the location of the user 182, an IP address of the media source 174, an identity of the user 182, a geographical location of the media source 174, and/or the like. In some cases, media content 106b from an untrusted media source 174 may still be presented as long as the media content 106b cannot be used to create synthetic media of protected individuals (e.g., individuals identified by identifiers 142a,b of FIG. 1).

At step 412, the image-based firewall system 112 determines if the intended purpose 130 of the media content 106b is a trusted or approved purpose. For example, the image-based firewall system 112 may use filtering criteria 152 that include rules for blocking presentation of all or a portion of the media content 106b based on the intended purpose 130 determined at step 408 to determine if all or a portion of the media content 106b should be blocked from presentation. For instance, if the intended purpose 130 matches a predefined purpose in the filtering criteria 152 that is not trusted, then all or a portion of the media content 106b may be blocked from presentation at steps 424 or 426.

At step 414, the image-based firewall system 112 determines if the identities or identifiers 148 of individuals appearing in the media content 106b correspond to individuals requiring increased protection against the creation of synthetic media. For example, a subset of all identifiers 142a,b in the structured media database 134 may correspond to individuals requiring increased protection against synthetic media. As mentioned briefly above, portions of the media content 106b that cannot be used to create synthetic media may be allowed to be presented, while only portions that can be used to create synthetic media (e.g., because of the appearance of certain facial features and/or expressions) may be blocked (see FIGS. 2B and 2C for example). For instance, even after determining that the media source 174 and/or associated third party user 182 is not trusted all or a portion of the media content 106b may still be presented as long as properties 150 are not identified for facial features and expressions that can be used to generate synthetic media of an individual appearing in the media content 106b.

At step 416, the image-based firewall system 112 determines whether the media content 106b can be used to create synthetic media. For example, the image-based firewall system 112 may use filtering criteria 152 that include rules for blocking presentation of all or a portion of the media content 106b based on properties 150, such as the types of facial features and expressions presented in the media content 106b (see step 406). The image-based firewall system 112 uses these filtering criteria 152 and the properties 150 to determine if types of facial features and expressions presented in the media content 106b can be used to generate synthetic media of individual(s). If such properties 150 are not present in the media content 106b, then presentation of the media content 106b may be allowed at step 420. Otherwise, all or a portion of the media content 106b is blocked from presentation at steps 424 or 426.

At step 418, the image-based firewall system 112 determines if all of the filtering criteria 152 from steps 410-416 are satisfied. If this is the case, the image-based firewall system 112 may determine that the action 154 for securing the media content 106b is to allow 156a the media content 106b. In this case, the image-based firewall system 112 proceeds to step 420 and allows presentation of the media content 106b (e.g., such that the secured media content 158 is the same as the media content 106b without any portion of the media content 106b blocked). However, if at step 418, all filtering criteria 152 are not satisfied, the image-based firewall system 112 proceeds to step 422.

At step 422, the image-based firewall system 112 determines whether a partial blocking of the media content 106b is sufficient and possible to secure the media content 106b. For example, the image-based firewall system 112 may determine if properties 150, such as facial features and/or expressions that can be used to create synthetic media, appear in only a portion of the media content 106b. If this is the case, partial blocking of the media content 106b may be sufficient/possible. Portions of the media content 106b with these properties (e.g., the face regions 212 and 222 of FIGS. 2B and 2C) may be blocked from presentation, while other portions are included in the secured media content 158. If partial blocking of the media content 106b is sufficient/possible at step 422, the image-based firewall system 112 determines the action 154 is to secure 156c the media content 106b. The image-based firewall system 112 then proceeds to step 424 and blocks presentation of a portion of the media content 106b in the secured media content 158 (see FIGS. 2B and 2C for illustrative examples of blocking a portion of media content 106b). However, if partial blocking of the media content 106b is not sufficient/possible at step 422, the image-based firewall system 112 determines the action 154 is to block 156b the media content 106b. The image-based firewall system 112 then proceeds to step 426 and blocks presentation of the media content 106b in its entirety (see the example of FIG. 2D).

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
a media source operable to store media content comprising one or both of an image or a video; and
a firewall system comprising:
a memory operable to store filtering criteria comprising rules for blocking communication of all or a portion of the media content based at least in part on an identity of an individual appearing in the media content;
a network interface configured to receive a request for the media content; and
a processor communicatively coupled to the memory and the network interface, the processor configured to:
determine characteristics of a user that provided the request for the media content;
determine the identity of the individual appearing in the media content;
determine an action for securing the media content, based at least in part on the characteristics of the user that provided the request for the media content, the identity of the individual appearing in the media content, and the filtering criteria, wherein the action comprises one of allowing communication of the media content, blocking communication of the media content, and blocking communication of a portion of the media content; and
automatically implement the determined action;
wherein:
the filtering criteria further comprise rules for blocking communication of all or the portion of the media content based on properties of the media content, the properties comprising types of facial features and expressions presented in the media content; and
the processor is further configured to:
determine, for the individual appearing in the media content, the types of facial features and expressions presented in the media content;
determine, using the filtering criteria, that the determined types of facial features and expressions presented in the media content can be used to generate synthetic media of the individual appearing in the media content; and
after determining that the types of facial features and expressions presented in the media content can be used to generate synthetic media of the individual appearing in the media content, determine that the action is to block communication of at least the portion of the media content.

2. The system of claim 1, wherein the processor is further configured to determine the identity of the individual appearing in the media content by:
detecting face features in the media content; and
comparing the detected face features to previously determined face features for known individuals.

3. The system of claim 1, wherein the characteristics of the user that provided the request for the media content comprise one or more of a geographical location of the user, an internet protocol (IP) address associated with a device of the user, and an identity of the user.

4. The system of claim 1, wherein the processor is further configured to implement the determined action by blocking communication of the face of the individual appearing in the media content at least when the types of facial features and expressions presented in the media content that can be used to generate synthetic media of the individual are visible.

5. The system of claim 1, wherein the processor is further configured to:
determine an identity of the user that provided the request for the media content;
determine, based at least in part on the determined identity of the user that provided the request for the media content, that the user that provided the request for the media content is not trusted; and
after determining that the user that provided the request for the media content is not trusted, determine that the action is to block communication of at least the portion of the media content.

6. The system of claim 1, wherein:
the filtering criteria further comprises:
rules for blocking communication of all or the portion of the media content based on whether the user that provided the request for the media content is trusted; and
rules for blocking communication of all or the portion of the media content based on properties of the media content, the properties comprising types of facial features and expressions presented in the media content; and
the processor is further configured to:
determine that the user that provided the request for the media content is not trusted;
determine, for the individual appearing in the media content, the types of facial features and expressions presented in the media content;
determine, using the filtering criteria, that the determined types of facial features and expressions presented in the media content cannot be used to generate synthetic media of the individual appearing in the media content; and after determining that the user that provided the request for the media content is not trusted and that the types of facial features and expressions presented in the media content cannot be used to generate synthetic media of the individual appearing in the media content, determine that the action is to allow communication of the media content.

7. The system of claim 1, wherein:
the memory is further operable to store a record of previous actions determined by the processor; and
the processor is further configured to:
   determine that the media content was previously requested by the user that provided the request for the media content and that a corresponding previous action is stored in the record of previous actions; and
   automatically implement the previous action.

8. A method, comprising:
storing media content comprising one or both of an image or a video; and
storing filtering criteria comprising rules for blocking communication of all or a portion of the media content based at least in part on an identity of an individual appearing in the media content;
receiving a request for the media content;
   determining characteristics of a user that provided the request for the media content;
   determining the identity of the individual appearing in the media content;
   determining, based at least in part on the characteristics of the user that provided the request for the media content, the identity of the individual appearing in the media content, and the filtering criteria, an action for securing the media content, wherein the action comprises one of allowing communication of the media content, blocking communication of the media content, and blocking communication of a portion of the media content; and
   automatically implementing the determined action;
wherein:
   the filtering criteria further comprise rules for blocking communication of all or the portion of the media content based on properties of the media content, the properties comprising types of facial features and expressions presented in the media content; and
   the method further comprises:
      determining, for the individual appearing in the media content, the types of facial features and expressions presented in the media content;
      determining, using the filtering criteria, that the determined types of facial features and expressions presented in the media content can be used to generate synthetic media of the individual appearing in the media content; and
      after determining that the types of facial features and expressions presented in the media content can be used to generate synthetic media of the individual appearing in the media content, determining that the action is to block communication of at least the portion of the media content.

9. The method of claim 8, further comprising determining the identity of the individual appearing in the media content by:
detecting face features in the media content; and
comparing the detected face features to previously determined face features for known individuals.

10. The method of claim 8, wherein the characteristics of the user that provided the request for the media content comprise one or more of a geographical location of the user, an internet protocol (IP) address associated with a device of the user, and an identity of the user.

11. The method of claim 8, further comprising implementing the determined action by blocking communication of the face of the individual appearing in the media content at least when the types of facial features and expressions presented in the media content that can be used to generate synthetic media of the individual are visible.

12. The system of claim 8, further comprising:
determining an identity of the user that provided the request for the media content;
determining, based at least in part on the determined identity of the user that provided the request for the media content, that the user that provided the request for the media content is not trusted; and
after determining that the user that provided the request for the media content is not trusted, determining that the action is to block communication of at least the portion of the media content.

13. The method of claim 8, wherein:
the filtering criteria further comprise:
   rules for blocking communication of all or the portion of the media content based on whether the user that provided the request for the media content is trusted; and
   rules for blocking communication of all or the portion of the media content based on properties of the media content, the properties comprising types of facial features and expressions presented in the media content; and
the method further comprises:
   determining that the user that provided the request for the media content is not trusted;
   determining, for the individual appearing in the media content, the types of facial features and expressions presented in the media content;
   determining, using the filtering criteria, that the determined types of facial features and expressions presented in the media content cannot be used to generate synthetic media of the individual appearing in the media content; and
   after determining that the user that provided the request for the media content is not trusted and that the types of facial features and expressions presented in the media content cannot be used to generate synthetic media of the individual appearing in the media content, determining that the action is to allow communication of the media content.

14. The method of claim 8, further comprising:
storing a record of previous actions determined by the processor; and
determining that the media content was previously requested by the user that provided the request for the media content and that a corresponding previous action is stored in the record of previous actions; and
automatically implementing the previous action.

15. A system, comprising:
a memory operable to store:
   media content comprising one or both of an image or a video; and
   filtering criteria comprising rules for blocking communication of all or a portion of the media content based at least in part on an identity of an individual appearing in the media content;
a network interface configured to receive a request for the media content; and a processor communicatively coupled to the memory and the network interface, the processor configured to:
  determine characteristics of a user that provided the request for the media content;
  determine the identity of the individual appearing in the media content;
  determine, based at least in part on the characteristics of the user that provided the request for the media content, the identity of the individual appearing in the media content, and the filtering criteria, an action for securing the media content, wherein the action comprises one of allowing communication of the media content, blocking communication of the media content, and blocking communication of a portion of the media content; and
  automatically implement the determined action;
wherein:
  the filtering criteria further comprise rules for blocking communication of all or the portion of the media content based on properties of the media content, the properties comprising types of facial features and expressions presented in the media content; and
  the processor is further configured to:
    determine, for the individual appearing in the media content, the types of facial features and expressions presented in the media content;
    determine, using the filtering criteria, that the determined types of facial features and expressions presented in the media content can be used to generate synthetic media of the individual appearing in the media content; and
    after determining that the types of facial features and expressions presented in the media content can be used to generate synthetic media of the individual appearing in the media content, determine that the action is to block communication of at least the portion of the media content.

16. The system of claim 15, wherein the processor is further configured to implement the determined action by blocking communication of the face of the individual appearing in the media content at least when the types of facial features and expressions presented in the media content that can be used to generate synthetic media of the individual are visible.

17. The system of claim 15, wherein:
the filtering criteria further comprise:
  rules for blocking communication of all or the portion of the media content based on whether the user that provided the request for the media content is trusted; and
  rules for blocking communication of all or the portion of the media content based on properties of the media content, the properties comprising types of facial features and expressions presented in the media content; and
the processor is further configured to:
  determine that the user that provided the request for the media content is not trusted;
  determine, for the individual appearing in the media content, the types of facial features and expressions presented in the media content;
  determine, using the filtering criteria, that the determined types of facial features and expressions presented in the media content cannot be used to generate synthetic media of the individual appearing in the media content; and
  after determining that the user that provided the request for the media content is not trusted and that the types of facial features and expressions presented in the media content cannot be used to generate synthetic media of the individual appearing in the media content, determine that the action is to allow communication of the media content.

* * * * *